United States Patent [19]
Watanabe et al.

[11] Patent Number: 5,732,156
[45] Date of Patent: Mar. 24, 1998

[54] PICTURE DATA COMPRESSION CODING DEVICE AND METHOD THEREOF

[75] Inventors: Mikio Watanabe; Kenji Ito; Kenji Moronaga, all of Tokyo, Japan

[73] Assignee: Fuji Photo Film, Co. Ltd., Kanagawa, Japan

[21] Appl. No.: 396,894

[22] Filed: Mar. 1, 1995

Related U.S. Application Data

[63] Continuation of Ser. No. 917,354, Jul. 23, 1992, abandoned.

[30] Foreign Application Priority Data

Aug. 30, 1991 [JP] Japan ................................ 3-244103

[51] Int. Cl.$^6$ ........................................................ G06K 9/46
[52] U.S. Cl. ........................... 382/239; 382/250; 348/405; 348/419
[58] Field of Search ................................. 382/239, 245, 382/246, 250; 348/403, 404, 405, 419, 420; 358/426, 427, 432, 433

[56] References Cited

U.S. PATENT DOCUMENTS

| | | | |
|---|---|---|---|
| 4,386,373 | 5/1983 | Kondo et al. | 358/260 |
| 4,780,761 | 10/1988 | Daly et al. | 358/133 |

(List continued on next page.)

FOREIGN PATENT DOCUMENTS

| | | | |
|---|---|---|---|
| 0238715 | 2/1988 | European Pat. Off. | H04N 1/41 |
| 3111823 | 3/1982 | Germany | H04N 1/41 |
| 3735349 | 4/1988 | Germany | H04N 1/415 |

(List continued on next page.)

OTHER PUBLICATIONS

IEEE Transactions on Communications, vol. Com. –32, No. 3, Mar. 1984; Chen & Pratt.

IEEE Transactions on Communications, vol. Com. –23, No. 11, Nov. 1977, Chen & Smith.

"Transformationen Zur Datenkompression Von Grauwerbildern" Dipl. Phys. Steffen Mehnert, Bild Und Ton 30 (1987) 9 pp. 261–268.

"Digital Still Video Camera Using Semiconductor Memory Card" F. Izawa, et al. IEEE Transactions on Consumer Electronics, vol. 36, No. 1, Feb. 1980, pp. 1–9.

(List continued on next page.)

*Primary Examiner*—Leo Boudreau
*Assistant Examiner*—Chris Kelley

[57] ABSTRACT

A device for coding picture data by compression, and a method thereof are provided. By preprocessing, the device calculates a picture activity of one frame of picture data. A quantizing table circuit selects a particular quantizing step matching the picture activity and sets the picture activity in a quantizing circuit. On a first path, one frame of picture data is fed to a discrete cosine transform (DCT) circuit to be thereby subjected to orthogonal transform. The quantizing circuit sequentially quantizes DC components, low frequency components and high frequency components of the resulting output of the DCT circuit in ascending order of frequency block by block according to a quantizing step set therein. The picture data from the quantizing circuit are coded by Huffman coding while a code counter counts the coded data. The quantizing step set in the quantizing circuit is updated on the basis of the amount of coded data and a target amount of codes. On a second path, the same one frame of picture data is again fed to the DCT circuit to undergo orthogonal transform and compression, as on the first path. The coded picture data are sent to a memory card or similar picture data storing medium. A bit distributing circuit produces a bit distribution value block by block. When the output count of the code counter associated with one block reaches the bit distribution value, the DCT circuit, quantizing circuit and Huffman coding circuit are disenabled while an EOB (End of Block) code is added to the end of the block of coded picture data.

47 Claims, 6 Drawing Sheets

U.S. PATENT DOCUMENTS

| | | | |
|---|---|---|---|
| 4,982,282 | 1/1991 | Saito et al. | 358/133 |
| 5,014,198 | 5/1991 | Umemura | 382/56 |
| 5,051,840 | 9/1991 | Watanabe et al. | 358/433 |
| 5,063,608 | 11/1991 | Siegel | 382/56 |
| 5,073,820 | 12/1991 | Nakagawa et al. | 358/133 |
| 5,086,488 | 2/1992 | Kato et al. | 382/56 |
| 5,101,280 | 3/1992 | Moronaga et al. | 358/426 |
| 5,170,264 | 12/1992 | Saito et al. | 358/433 |

FOREIGN PATENT DOCUMENTS

| | | | |
|---|---|---|---|
| 3800634 | 7/1988 | Germany | G06F 15/66 |
| 3709094 | 10/1988 | Germany | H04N 1/41 |
| 63-227272 | 9/1988 | Japan | H04N 1/411 |

OTHER PUBLICATIONS

"Image Data Compression: A Review", Anil K. Jain, Proceedings of the IEEE, vol. 69, Mar. 1981, pp. 349–384.

"Performance of Block Cosine Image Coding With Adaptive Quantization", James W. Modestino, IEEE Transactions on Communications, vol. COM–33, No. 3, Mar. 1985, pp. 210–217.

| SSSS | DCT TRANSFORM COEFFICIENT OF AC COMPONENT |
|---|---|
| 1 | −1,1 |
| 2 | −3,−2,2,3 |
| 3 | −7..−4,4,...7 |
| 4 | −15..−8,8..15 |
| 5 | −31..−16,16..31 |
| 6 | −63..−32,32..63 |
| 7 | −127..−64,64..127 |
| 8 | −255..−128,128..255 |
| 9 | −511..−256,256..511 |
| 10 | −1023..−512,512..1023 |

PICTURE DATA COMPRESSION CODING DEVICE AND METHOD THEREOF

This application is a continuation of application Ser. No. 07/917,354 filed on Jul. 23, 1992, now abandoned.

BACKGROUND OF THE INVENTION

1. Field of the Invention

The present invention relates to a picture data processing device and, more particularly, to a device for coding picture data by compression using bidimensional orthogonal transform, and a method thereof.

2. Description of the Related Art

It is a common practice with a digital electronic still camera or similar still picture processing system to convert an analog picture signal to digital picture data, compress the picture data to an amount smaller than a desired amount, and record the compressed picture data in a semiconductor memory, magnetic disk, optical disk or similar picture data recording medium. A bidimensional orthogonal transform system, for example, divides one frame of picture data into a predetermined number of blocks each having a predetermined size and converts each block of picture data to data of frequency domain, i.e., transform coefficients. Among the transform coefficients, the coefficients smaller than a predetermined threshold are discarded while the other coefficients are divided by a predetermined quantizing step, i.e., normalizing coefficient to he thereby normalized. The normalized coefficients sore compressed by run length coding and Huffman coding and then written to a picture data storing medium. This kind of procedure is successful in using the capacity of the storing medium efficiently. For details of the bidimensional orthogonal transform and other compression coding schemes, a reference may be made to, for example, Japanese Patent Application No. 309870/1988 having the same applicant as the present application.

A prerequisite for the still image processing system is that a desired number of picture data be stored in a memory card or similar picture data storing medium having a limited capacity. To meet this requisite, Japanese Patent Application No. 27499/1989 having the same applicant as the present invention, for example, allocates a particular bit distribution value to each block of one frame of picture data in relation to an activity, sequentially compresses low frequency components to high frequency components in this order, and stops the compression as soon as the amount of codes reaches the bit distribution value. While this approach successfully maintains the amount of compressed codes constant, it cannot control the amount of codes in a delicate way. Specifically, it is likely that some of the storage locations available for recording, for example, one frame of picture data are left idle, resulting in limited efficiency. Moreover, once the amount of codes distributed on the basis of an activity is deviated from a predicted amount, the number of pictures which can be stored in a recording medium is reduced. In addition, such control over the amount of codes is not practicable without resorting to a large scale and complicated circuit arrangement.

SUMMARY OF THE INVENTION

It is therefore an object of the present invention to provide a picture data compressing device capable of controlling the amount of codes accurately with a simple arrangement, and a method thereof.

In accordance with an embodiment of the present invention, a device for coding first picture data by compression to produce corresponding second picture data comprises a first calculating circuit for calculating a rough amount of information associated with one frame of first picture data, an orthogonal transform circuit for dividing the one frame of first picture data into a plurality of blocks each having a predetermined size, and executing orthogonal transform with each of the plurality of blocks, a compression coding circuit for sequentially quantizing and coding DC components, low frequency components and high frequency components included in an output of the orthogonal transform circuit in ascending order of frequency), according to a quantizing step to thereby produce second picture data, the quantizing step being variably set in the compression coding circuit, a first counter for counting codes associated with the second picture data, a setting circuit for selecting a quantizing step on the basis of either of the rough amount of information and an output count of the first counter and a target amount of codes associated with one frame of second picture data, and setting the quantizing step in the compression coding circuit, a second calculating circuit for calculating a code distribution value for each of the plurality of blocks in response to an output of the orthogonal transform circuit and the target amount of codes, and a first comparing circuit for comparing, after the setting circuit has set a quantizing step matching the output count of the compression coding circuit, an output count of the first counter associated with the second picture data from the compression coding circuit with the calculated code distribution value and, when the output count reaches the code distribution value, disenabling the orthogonal transform circuit and compression coding circuit.

Also, in accordance with the present invention, a method of coding first picture data by compression to produce corresponding second picture data comprises the steps of calculating a rough amount of information associated with one frame of first picture data, dividing the one frame of first picture data into a plurality of blocks each having a predetermined size, executing orthogonal transform with each of the plurality of blocks, quantizing and coding DC components, low frequency components and high frequency components of the picture data having undergone orthogonal transform in ascending order of frequency according to a quantizing step matching the rough amount of information and a target amount of codes associated with one frame or second picture data to thereby produce second picture data, counting codes associated with the second picture data, updating the quantizing step in matching relation to the amount of codes counted and the target amount of codes, again quantizing and coding the DC components, low frequency components and high frequency components of the picture data having undergone the orthogonal transform in ascending order of frequency according to the updated quantizing step to thereby produce second picture data, calculating a code distribution value for each of the plurality of blocks on the basis of the output second picture data and the target amount of codes, counting codes associated with the output second picture data, and comparing the amount of codes calculated and the code distribution value and, when the former reaches the latter, stopping conversion to second picture data.

BRIEF DESCRIPTION OF THE DRAWINGS

The above and other features of the present invention will become more apparent from the consideration of the following detailed description taken in conjunction with the accompanying drawings in which.

DESCRIPTION OF THE PREFERRED EMBODIMENTS

Figures 1, 1A:
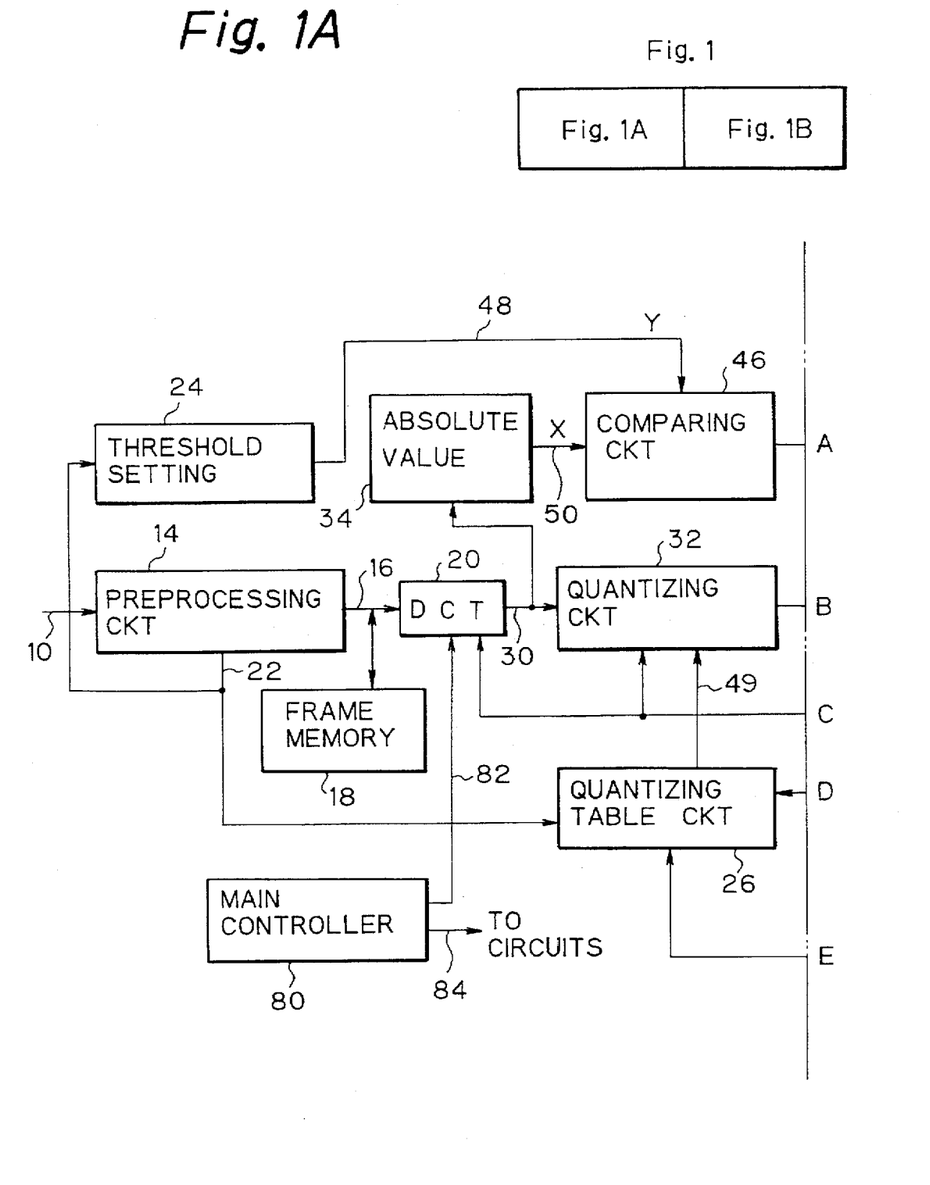
FIGS. 1A and 1B show a functional block diagram schematically illustrating a picture data compression coding device embodying the present invention and applied to a digital still camera or similar still picture processing system by way of example.
Figure 1B:
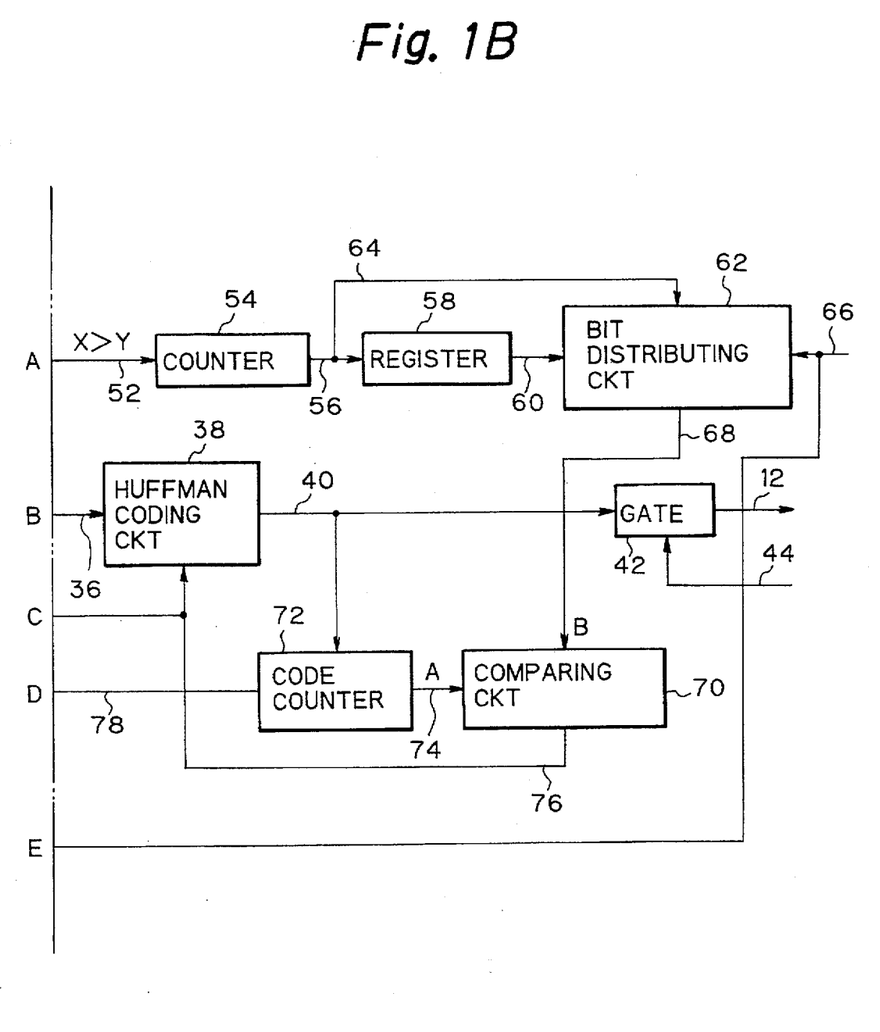

Referring to FIGS. 1A and 1B of the drawings, a picture data compression coding device embodying the present invention is shown which is applicable to a digital electronic still camera or similar system for processing picture data. The compression coding device receives a picture signal at an input terminal 10 thereof from a picture data source included in a solid-state imaging device, codes the picture signal by compression using bidimensional orthogonal transform, and produces the resulting transform coefficients on an output terminal 12. A memory card or similar picture data storing medium may be connected to the output terminal 12. The input terminal 10 is connected to a preprocessing circuit 14 which converts the picture signal to corresponding digital picture data. The preprocessing circuit 14 may have a function of transforming a color component signal to luminance and chrominance signals. For example, when red (R), green (G) and blue (B) color component signals are fed to the input terminal 10 of the coding device, the preprocessing circuit 14 will convert the color component signals to a luminance signal (Y) and a chrominance signal (C). The digital picture data appears on one output 16 of the preprocessing circuit 14 which is connected to a frame memory 18 and a discrete cosine transform (DCT) circuit 20. In addition, the preprocessing circuit 14 has a function of calculating a rough amount of information associated with one frame of picture data, e.g., a picture activity ACT in parallel with the signal conversion. The picture activity ACT appears on the other output 22 of the preprocessing circuit 14 which is connected to a threshold setting circuit 24 and a quantizing table circuit 26. The picture activity ACT will be described later specifically.

The frame memory 18 plays the role of a storage for temporarily storing one frame of picture data fed from the preprocessing circuit 14. The DCT circuit 20 reads, under the control of a main controller 80 which will be described, one frame of picture data out of the frame memory 18 while dividing the picture data into blocks each having a predetermined size. The DCT circuit 20 effects DCT, which belongs to a family of conventional bidimensional transform schemes, with each block of picture data to thereby convert the picture data in the space domain to data in the frequency domain, i.e., to transform coefficients. The transform coefficients are fed to a quantizing circuit 32 and an absolute value circuit 34 via the output 30 of the DCT circuit 20. The quantizing circuit 32 normalizes the block-by-block transform coefficients by dividing the block-by-block-transform coefficients by a quantizing step, i.e., normalizing coefficient in the order of DC components, low frequency components and high frequency components. The resulting normalized transform coefficients are delivered to a Huffman coding circuit 38 via the output 36 of the quantizing circuit 32. The Huffman coding circuit 38 codes the normalized transform coefficients by run length coding and Huffman coding, the resulting data appearing on an output 40. As a result, the picture data undergo adaptive DCT. The output 40 of the Huffman coding circuit 38 is connected to a gate 42 having a control input 44 to which a path select signal is fed from a system. In response to the path select signal, the gate 42 selectively connects the input 40 thereof to the output 12 of the device or disconnects the former from the latter. Let the signal path extending from the input 10 to the output 12 via the DCT circuit 20 be referred to as a first path hereinafter. The path select signal applied to the control input 44 of the gate 42 selects either of the first path and a second path which will be described later.

Figure 2:
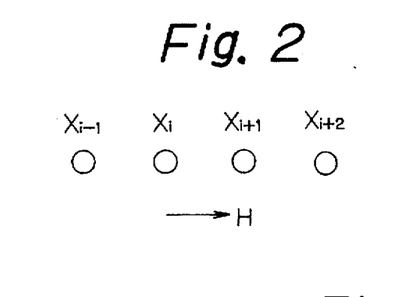
FIG. 2 shows a specific sequence of pixels useful for understanding the operation of the embodiment.
Figure 3:
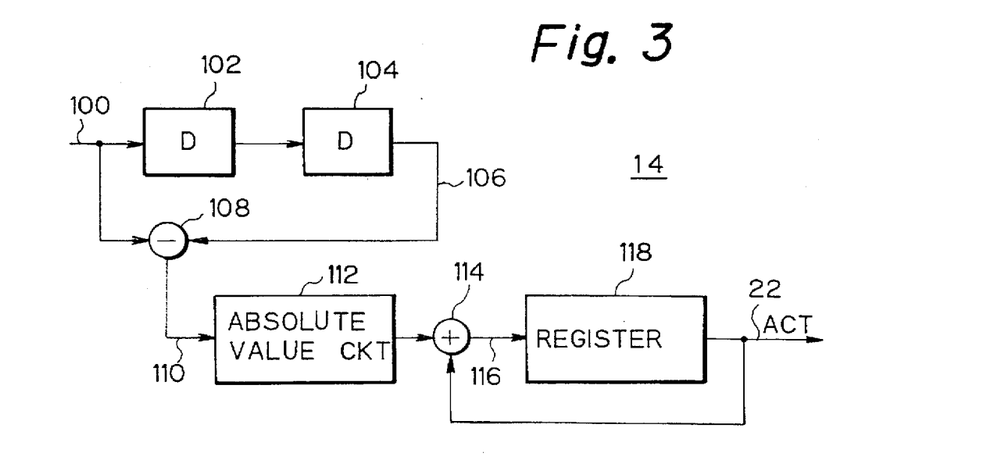
FIGS. 3 and 4 are functional block diagrams each schematically showing a specific construction of an activity calculating circuit included in the embodiment.

The preprocessing circuit 14 extracts an aperture, i.e., calculates a picture activity ACT as to the AC components of picture data, as mentioned earlier. The picture activity ACT may advantageously be produced by calculating a difference between every second pixel data in the horizontal scanning direction H of a screen and adding the absolute values of such differences. Specifically, as shown in FIG. 2, assume a sequence of pixels $X_i$ where i is representative of natural numbers 1 to N (N being the total number of pixels in the horizontal scanning direction H). Then, the picture activity ACT will be determined by summing up the absolute values $|X_i - X_{i-2}|$ with respect to i of 2 to N. FIG. 3 shows specific circuitry for performing such calculations. As shown, consecutive picture data are applied to an input 100 in, for example, the horizontal scanning direction H. The data coming in through the input 100 are routed through two delay circuits 102 and 104 to a subtractor 108 while being directly fed to the subtractor 108. The delay circuits 102 and 104 each delays the input data by a predetermined period of time. The subtractor 108 subtracts the output 106 of the delay circuit 104 from the input 100 and delivers the resulting difference to an absolute value circuit 112 via an output 110 thereof. The absolute value circuit 112 produces the absolute value of the difference and feeds the difference to an adder 114. The adder 114 and a register 118 connected to the output of the adder 114 sequentially sum up such absolute values. If desired, the picture activity ACT may be calculated in the vertical direction of a screen in place of the horizontal direction.

Figure 4:
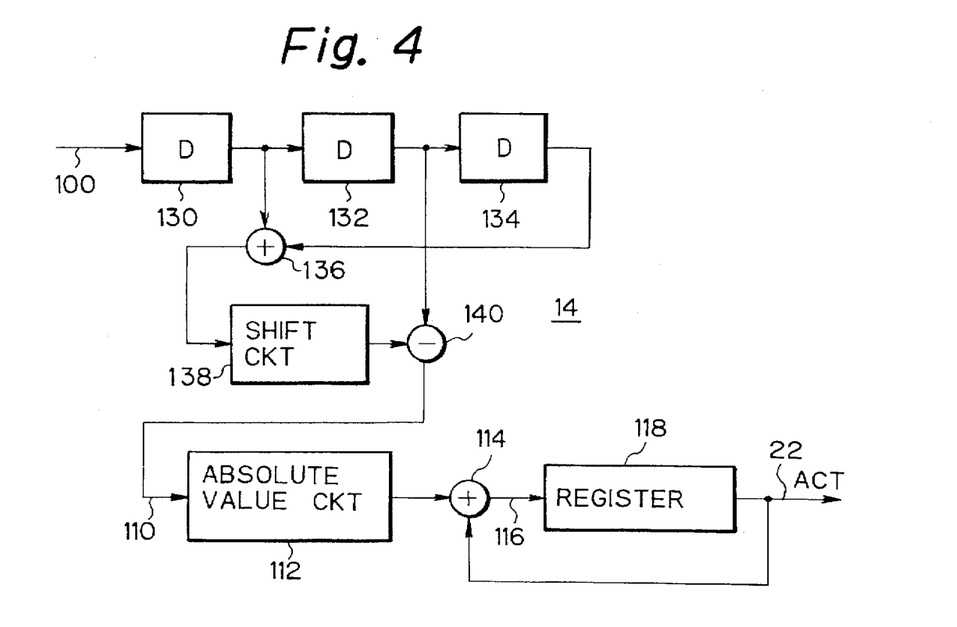

Another approach available for producing a picture activity ACT is to determine a difference between the value of given pixel data and the mean value of pixel data preceding and succeeding the given pixel data in the horizontal scanning direction H, determine the absolute value of the difference, and sum up such absolute values. FIG. 4 shows specific circuit arrangement for implementing this alternative approach. As shown, assuming a sequence of pixels $X_i$ in the horizontal scanning direction H, delay circuits 130, 132 and 134 and an adder 136 add the values of two pixels preceding and succeeding a pixel of interest, i.e., $X_{i-1} + X_{i+1}$. A shift circuit 138 produces a mean value $(X_{i-1} + X_{i+1})/2$. A subtractor 140 produces a difference between the value of the pixel of interest fed from the delay circuit 132 and the mean value fed from the shift circuit 138. Then, an absolute value circuit 112 outputs the absolute value $|X_i - (X_{i-1} + X_{i+1})/2|$ of the resulting difference. A register circuit 118 identical with the register circuit 118 of FIG. 3 sums up the consecutive absolute values associated with the i of 2 to N−1. As a result, a picture activity appears on the output 22.

It is to be noted that the preprocessing circuit 14 may be so constructed as to calculate the picture activity ACT not only in the horizontal direction H but also in the vertical direction and add the resulting two aperture outputs.

Referring again to FIGS. 1A and 1B, the quantizing step for the quantizing circuit 32 is variably set by the quantizing table circuit 26 via an output 49 of the latter. Specifically, the picture activity ACT produced by the above procedure is fed to the quantizing table circuit 26. In response, the quantizing table circuit 26 sets a particular quantizing step matching the picture activity ACT in the quantizing circuit 32 via the output 49.

The picture activity ACT from the preprocessing circuit 14 is applied to the threshold setting circuit 24 also. In response, the threshold setting circuit 24 delivers a threshold Y for comparison matching the picture activity ACT to one input of a comparing circuit 46 via an output 48 thereof. Delivered to the other input of the comparing circuit 46 is a signal X appearing on the output 50 of the absolute value circuit 34. When the signal X is greater than the threshold Y, the comparing circuit 46 renders an output 52 thereof significant. The absolute circuit 34 receives a transform coefficient 30 from the DCT circuit 20 and, in turn, produces the absolute value of the transform coefficient 30 on the output 50. The output 52 of the comparing circuit 52 is connected to a counter 54. The counter 54 counts the number of times theft the output 52 of the comparing circuit 46 becomes significant. The output 56 of the counter 54 is connected to a register 58. The register 58 holds the output of the counter 54 associated with one frame of picture data., i.e., the number of DCT capitulation outputs or DCT coefficients exceeding the threshold and included in one picture. The number of such DCT coefficients will be referred to as a total block activity hereinafter. The register 58 has an output 60 thereof connected to a bit distributing circuit 62. The output 54 of the counter 56 is also connected to the other input 64 of the bit distributing circuit 62. In this configuration, the bit distributing circuit 62 receives the consecutive outputs of the counter 54 each being associated with one block of picture data included in one frame at the input 64 thereof. Let the count of the counter 54 associated with one block of picture data be called a block activity. A picture data storing medium, not shown, connected to the output terminal 12 sends a target amount of codes associated with one frame of picture data to another input 66 of the bit distributing circuit 62. In response to the target amount of codes, i.e., command 66, the bit distributing circuit 62 calculates a bit distribution value B representative of an adequate amount of code distribution block by block on the basis of the ratio of the block activity to the total block activity. The bit distributing circuit 62 delivers the bit distribution value B to one input of a comparing circuit 70 via an output 68 thereof.

The output 40 of the Huffman coding circuit 38 is also connected to a code counter 72. The code counter 72 counts the transform coefficients 40 from the Huffman coding circuit 38 block by block to thereby determine a total amount of codes A. The block-by-block total amount of codes A is delivered to the comparing circuit 70 via an output 74. The comparing circuit 70 compares the total amount of codes A with the bit distribution value B fed from the bit distributing circuit 62 and, when the former reaches the latter, produces a code stop signal on an output 76 thereof. The code stop signal is sent to the control inputs of the DCT circuit 20, quantizing circuit 32, and Huffman coding circuit 38. As the code stop signal 76 becomes significant, the DCT circuit 20, quantizing circuit 32 and Huffman coding circuit 38 stop operating. At this instant, the Huffman coding circuit 38 adds a particular code indicative of the end of coded data to the last code and produces the particular code on the output 40 thereof. In the illustrative embodiment, the above-mentioned particular code is implemented as an EOB (End Of Block) code.

The code counter 72 counts one frame of coded data as well and feeds the count to the quantizing table circuit 26 via an output 78 thereof. The quantizing table circuit 26 compares the amount of one frame of codes 78 with the target amount of codes fed from the input 66 and constantly updates the quantizing step on the basis of the picture activity ACT fed from the input 22. Regarding the target amount of code, an adequate value is selected which insures the number of picture frames to be recorded in a memory card or similar picture data recording medium, which will be connected to the output 12, as well as desirable picture quality.

The main controller 80 totally controls the various blocks constituting the compression coding device. Specifically, the main controller 80 controls the DCT circuit 20 to read picture data out of the frame memory 18 and execute orthogonal transform therewith, as represented by a control line 82. Further, the main controller 80 is connected to the other various circuits to control their operations which will be described, as symbolically represented by a control line 84.

Figure 5:
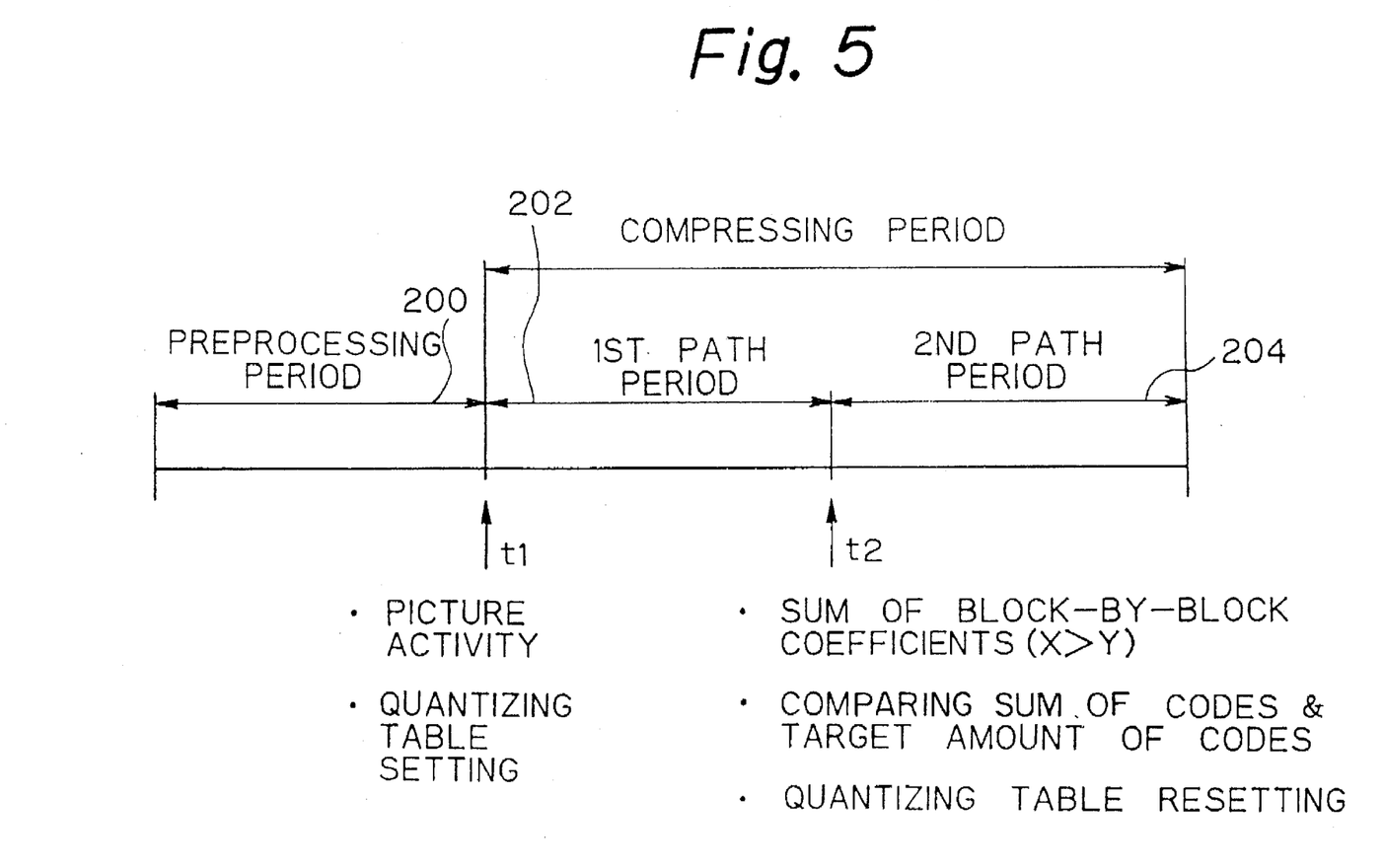
FIG. 5 is a timing chart representative of consecutive operation periods particular to the embodiment.

In operation, assume that a solid-state imaging device connected to the input terminal 10 sends one frame of R, G and B color component signals. Then, the preprocessing circuit 14 transforms the R, G and B signals to corresponding digital picture data under the control of the main controller 80, thereby producing signals Y and C. In FIG. 5, such a preprocessing procedure is represented by a period 200. The operations of the individual circuits constituting the coding device which will be described are supervised by the main controller 80. At a time t1 when the period 200 ends, the preprocessing circuit 14 stores the digital picture dam in the frame memory 18 while calculating a picture activity ACT. The picture activity ACT is applied to the quantizing table circuit 26 which in turn sets a particular quantizing step matching the picture activity ACT in the quantizing circuit 32.

In a period 202 following the preprocessing period 200, the DCT circuit 20 divides the one frame of picture data temporarily stored in the frame memory 18 into blocks each having a predetermined size and reads them out block by block. At this instant, a path select signal designating the previously mentioned first path is applied to the input 44 of the gate 42, causing the gate 42 to prevent signals from reaching the output terminal 12. The DCT circuit 20 effects DCT with the blocks of picture data to produce transform coefficients. The quantizing circuit 32 normalizes the transform coefficients by use of the quantizing step, i.e., normalizing coefficient set therein by the quantizing table circuit 26. For such normalization, the DC components, low frequency components and high frequency components included in each block are scanned in a zigzag manner in ascending order of frequency. The Huffman coding circuit 38 converts the normalized transform coefficients to codes by run length coding and Huffman coding. Since the gate 42 is disenabled by the path select signal 44, the gate 42 does not pass the output signal 40 of the Huffman coding circuit 38.

The code counter 72 counts the coded data sequentially coming out of the Huffman coding circuit 313. On counting one frame of codes (time t2, FIG. 5), the code counter 72 delivers the count to the quantizing table circuit 26. In response, the quantizing table circuit 25 compares the amount of the one frame of codes 78 with the target amount of codes fed thereto via the input terminal 66 and updates, i.e., resets the quantizing step on the basis of the picture activity ACT. Thereafter, the quantizing circuit 32 again performs quantization by using the updated quantizing step, as will be described later specifically.

The preprocessing circuit 14 delivers the picture activity ACT to the threshold setting circuit 24 as well The threshold circuit 24 sets a threshold Y matching the picture activity ACT in the comparing circuit 46. Hence, a single threshold value is set in the comparing circuit 46 for one frame of picture data. The absolute value circuit 34 extracts the absolute value X of each transform coefficient 30 outputted by the DCT circuit 20. If the absolute value X is greater than the threshold Y, the comparing circuit 46 renders the output 52 thereof significant. The counter 54 counts the number of times that the output 52 of the comparing circuit 46 becomes significant. As the counter 54 completes such an operation with one frame of picture data, the register 58 holds the count of the counter 54 as the previously stated total block activity. The sequence of steps described so far is the first path.

The period 202 representative of the first path is followed by a period 204 assigned to a second path. At a time t2 when the second path 204 begins, a path select signal designating the second path is sent from the system to the input 44 of the gate 42, allowing the gate 42 to pass signals to the output terminal 12 therethrough. The quantizing step updated by the first path 202 exists in the quantizing circuit 32, as stated earlier. As a result, the one frame of picture data temporarily stored in the frame memory 18 is again read by the DCT circuit 20 block by block and subjected to DCT in the same manner as on the first path. The quantizing circuit 32 normalizes the resulting transform coefficients according to the updated quantizing step and by the previously stated block-by-block zigzag scanning. The Huffman coding circuit 38 codes the normalized transform coefficients. At this time, the coded signals 40 from the Huffman coding section 38 are sequentially applied to the output terminal 12 via the gate 42 which is enabled. Consequently, the picture data having undergone DCT are sent to a picture data storing medium via the output terminal 12.

At the same time, the absolute value circuit 34 extracts an absolute value X from each transform coefficient 30 fed from the DCT circuit 20, as on the first path. If the absolute value X is greater than the threshold Y, the comparing circuit 46 renders the output 52 thereof significant. The counter 54 counts the number of times that the output 52 of the comparing circuit 52 becomes significant, block by block. The bit distributing circuit 62 determines a ratio of the block-by-block output 56 of the counter 54 to the total block activity held in the register 58, calculates an adequate bit distribution value B matching the determined ratio block by block, and sets the bit distribution value B in the comparing circuit 70. The comparing circuit 70 constantly receives the varying count A from the code counter 72 while comparing the count A with the bit distribution value B. As the count A reaches the bit distribution value B, the comparing circuit 70 produces a code stop signal on the output 76 thereof. As the code stop signal fed to the control inputs 76 of the DCT circuit 20, quantizing circuit 32 and Huffman coding circuit 38 becomes significant, the circuits 20, 32 and 38 stop operating. The Huffman coding circuit 38 adds the previously mentioned EOB code to the last code and sends this EOB code out via the output 40. The processing described above is the second path.

Figure 7:
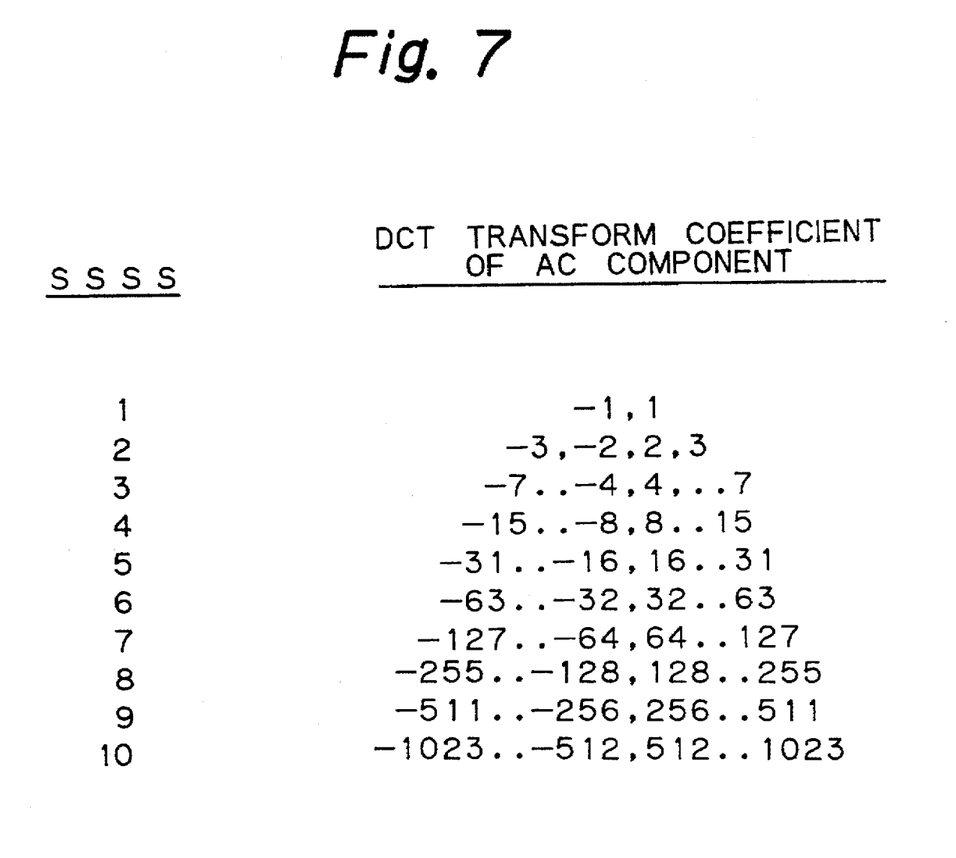
FIG. 7 shows a specific dynamic conversion table applicable to the embodiment for determining a block-by-block bit distribution value.

In the illustrative embodiment, the block-by-block bit distribution is computed on the basis of a DCT transform coefficient. In the circuitry shown in FIGS. 1A and 1B, such computation is implemented by the counter 54, register 58, and bit distribution circuit 62. Alternatively, the bit distribution may be determined by inputting the output of the comparing circuit 46 to a conversion table which lists a plurality of categories, e.g., dynamic ranges, and cumulatively adding outputs matching such inputs, i.e., the values in index notation indicative of the dynamic ranges to which the input signals belong. An example of such a conversion table is shown in FIG. 7 and may be identical with the conversion table used to compress picture data. In FIG. 7, on receiving, for example, a transform coefficient "9" of an AC component, the table outputs a value "4" of index SSSS. These values will be accumulated to determine a bit distribution.

To summarize the embodiment described above, picture data are coded by compression in both of the periods of the first and second paths 202 and 204. On the first path, 202, compression is effected on the basis of an amount of information roughly determined by the preprocessing, and the amount of one frame of codes is determined. The quantizing table circuit 26 is updated in matching relation to the amount of one frame of codes. On the second path 204, the picture data are again compressed according to the updated quantizing step to produce corresponding coded data. At this instant, the amount of codes is determined block by block to produce a block activity, and an adequate bit distribution value is selected on the basis of a ratio of the block activity to the total block activity corresponding to the target amount of codes. As soon as the amount of coded data reaches the bit distribution value, the compression coding procedure is terminated. Hence, whatever the input picture data may be, the embodiment is capable of coding them while controlling the amount of codes with accuracy. It is, therefore, possible to insure a predetermined number of still picture frames in a memory card or similar picture data storing medium.

Figure 6:
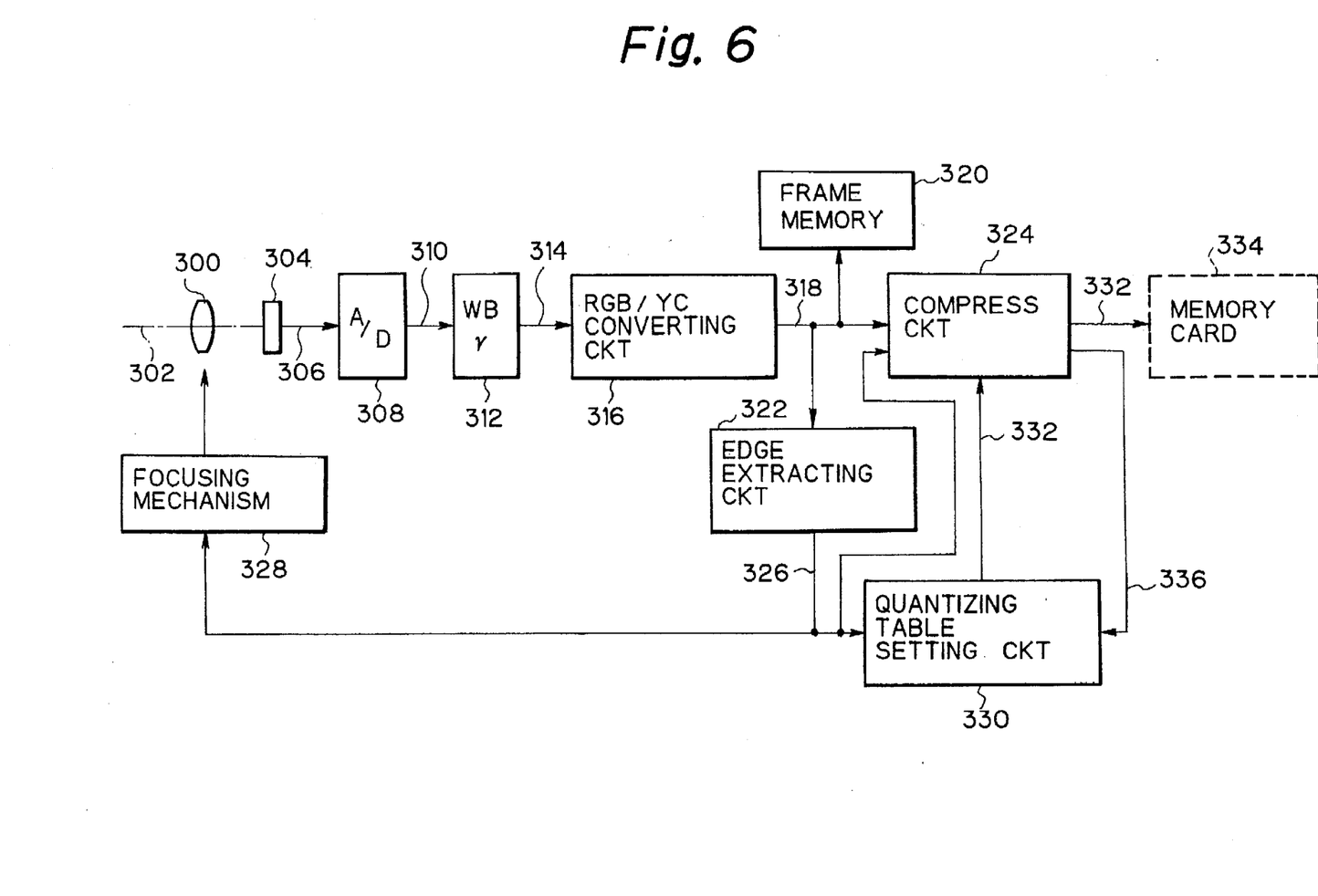
FIG. 6 is a functional block diagram representative of a specific application of the present invention to an automatic focusing system of a digital electronic still camera.

FIG. 6 shows an alternative embodiment of the present invention applied to an automatic focusing device included in a digital electronic still camera. In this alternative embodiment, the circuitry for calculating a picture activity plays the role of an edge extracting circuit of an automatic focusing device at the same time. Stated another way, the camera uses the value of edge components in place of the picture activity ACT of the embodiment of FIGS. 1A and 1B as a rough amount of picture information for setting a quantizing table and a threshold for one frame of picture data at the preprocessing stage.

As shown in FIG. 6, the camera has a lens 300 for picking up a scene, and a CCD (Charge Coupled Device) or similar solid-state imaging device 304 positioned on the optical axis 302 of the lens 300. As the lens 300 focuses a picture onto the surface of the solid-state imaging device 304, the imaging device 304 outputs a video signal in the form of R, G and B or similar color component signals. The output 306 of the imaging device 304 is connected to an analog-to-digital converter (ADC) 308. The ADC 308 converts the video signal to corresponding digital data and delivers the digital data to a white balance (WB) and tone or gamma ($\gamma$) adjusting circuit 312 via an output 310 thereof. The WB and $\gamma$ adjusting circuit 312 adjusts the white balance of the picture data while correcting the tonality or gamma of the same. The output 314 of the WB and $\gamma$ adjusting circuit 312 is fed to an RGB/YC converting circuit 316 so as to be converted to signals Y and C. The output 318 of the RGB/YC converting circuit 316 is connected to the frame memory 20, an edge extracting circuit 322, and a compressing circuit 324.

The frame memory, 320, like the frame memory 18 of FIGS. 1A and 1B, temporarily stores one frame of signals Y and C fed from the RGB/YC converting circuit 316. The edge extracting circuit 322 determines a difference between nearby pixels of the signals Y and C and sums up such differences to identify the edge of a pattern. The resulting sum, i.e., an edge component value, is applied to a focusing mechanism 328 and a quantizing table setting circuit 330 via an output 326. The focusing mechanism 328 supports the lens 300 such that the lens 300 is movable back and forth along the optical axis 302. Specifically, the focusing mechanism 328 moves the lens 300 along the optical axis 302 in response to the edge component value 326 to a position where the edge component value 326 becomes maximum. Hence, the feedback loop including the lens 300, RGB/YC converting circuit 316, edge extracting circuit 322 and focusing mechanism 328 constitutes an automatic focusing system.

In the circuitry of FIG. 6, it is important to note that the edge component 326 produced by the edge extracting circuit 322 has a relation with or corresponds to the previously stated picture activity ACT. Paying attention to this characteristic, the illustrative embodiment connects the output 326 of the edge extracting circuit 322 to the input of the quantizing table setting circuit 330. The quantizing table setting circuit 330, like the quantizing table circuit 26 of FIGS. 1A and 1B, sets a quantizing step table in the compressing circuit 324 via an output 232 thereof in response to the edge component input 326 which corresponds to the control input 22, FIGS. 1A and 1B. The compressing circuit 324 basically plays the roles of the preprocessing circuit 14, DCT circuit 20, quantizing circuit 32, and Huffman coding circuit 38 included in the embodiment of FIGS. 1A and 1B. More specifically, the compressing circuit 324 includes functional circuits equivalent to the threshold setting circuit 24, absolute value circuit 34, comparing circuit 46, counter 54, register 58, bit distributing circuit 52, comparing circuit 70, gate 42, and main controller 80 associated with the circuits 14, 20, 32, and 38. Such functional circuits will not be described specifically to avoid redundancy. Part of the compressing circuit 324 corresponding to the gate 42, FIGS. 1A and 1B, produces an output 332. The output 332 is routed through, for example, a memory interface to a memory card or similar device 334 which uses the compressed data. The compressing circuit 324 further has a function corresponding to that of the code counter 72, i.e., the compressing circuit 324 counts codes on the first path and feeds the count to the quantizing table setting circuit 330 over a connection line 336. In addition, the output 326 of the edge extracting circuit 322 is also connected to the compressing circuit 324 in order to implement a function corresponding to that of the threshold setting circuit 24, FIGS. 1A and 1B. The connection line extending from the edge extracting circuit 322 to the compressing circuit 324 is omissible if the threshold is fixed.

In operation, a picture representative of a desired scene is focused by the lens 300 onto the surface of the solid-state imaging device 304. The imaging device 304 transforms the incident picture to corresponding analog R, G and B signals. Then, the ADC 308 converts the R, G and B signals to corresponding digital data. The digital data are subjected to white balance adjustment and tone correction at the WB and γ adjusting circuit 312 and then converted to YC data by the RGB/YC converting circuit 316. The YC data are once stored in the frame memory 320. By such a procedure, one frame of picture data are stored in the frame memory 320. At this instant, the edge extracting circuit 322 separates the edge of a pattern from the YC signal 318 fed from the converting circuit 316. The separated edge component value 326 is delivered to the focusing mechanism 328 and quantizing table setting circuit 330. In response to the edge component value 326, the focusing mechanism 328 moves the lens 300 along the optical axis 302 to a position where the signal 326 becomes maximum, whereby the focus of the lens 300 is adjusted. As the edge is extracted throughout one frame of picture data, the quantizing table circuit 330 selects a particular quantizing step matching the output 326 of the edge extracting circuit 322 and sets the output 326 in the compressing circuit 324. This part of the procedure corresponds to the preprecessing period 200, FIG. 5, in which a quantizing table is set on the basis of a rough amount of information or picture activity ACT associated with one frame of picture data.

After a quantizing table has been set in the compressing circuit 324, the compressing circuit 324 reads the picture data out of the frame memory 320 block by block and effects DCT, quantization and Huffman coding therewith. This process corresponds to the first path stated earlier and, therefore, prevents the compressing circuit 324 from producing the coded data on the output 332 thereof. The compressing circuit 324 counts the resulting codes associated with one frame of data, compares the count with a target amount of codes, and then controls the quantizing table setting circuit 330 via the connection line 336 on the basis of the result of comparison. In response, the quantizing table setting circuit 330 updates the quantizing table and sets the quantizing table again in the compressing circuit 324. Further, the compressing circuit 324 sets a threshold matching the edge component 326 and counts, among the absolute values of DCT calculation outputs, i.e., transform coefficients, the absolute values greater than the threshold with respect to one frame of picture data to thereby produce a total block activity.

When the quantizing table is updated as stated above, the compressing circuit 324 starts on the second path 204 for reading the picture data out of the frame memory 320 block by block again and repeating DCT, quantization, and Huffman coding. At this time, the coded data are sequentially sent to, for example, the memory card 334 via the output 332 of the compressing circuit 332. The compressing circuit 324 calculates the block activity of the codes of the block being compressed and then determines an adequate bit distribution on the basis of the ratio of the block activity to the total block activity. As the amount of codes associated with the block of interest reaches the bit distribution value, the compressing circuit 324 stops compressing the picture data and produces an EOB code on the output 332. This part of the operation is identical with the operation of embodiment shown in FIGS. 1A and 1B. As stated above, the camera of FIG. 6 uses the edge extracting circuit of the automatic focusing device as a picture activity calculating circuit.

The embodiment described above may be summarized as follows. In the control over the amount of codes to be produced by compression using orthogonal transform, a quantizing step is determined by the combination of feedforward control and feedback control. First, a rough amount of information associated with picture data is fed forward to determine a first quantizing step, and then picture data are coded by the first quantizing step. Subsequently,, the quantizing step is corrected, i.e., updated on the basis of the cumulative value of the amounts of codes associated with one picture by a feedback principle. At this instant, the amount of information is determined block by block by a separate procedure, and block-by-block bit distribution is determined in matching relation to a ratio of the amount of information of each block to the cumulative value of one picture. As a result, the amount of codes is controlled block by block on the basis of the block-by-block bit distribution.

The rough amount of information to be determined first and the amount of information to be determined next on a block basis may each be implemented with a different calculation system. It follows that the first quantizing step can be obtained before the processing for compression begins, i.e., before the picture data are scanned on a block basis and fed to the compressing section 20, 32 and 38. Specifically, it is possible to determine the first quantizing step at the preprocessing stage wherein picture data are scanned in the horizontal direction by raster scanning, e.g., at the stage of aperture extraction for RGB/YC conversion or automatic focus control. Hence, the embodiment has two different compression paths and, in addition, can reset or correct, the quantizing step. Should the amount of information for determining a quantizing step and the amount of information for bit distribution be produced by a single calculation system, a quantizing step would be set only once after the first one of the two consecutive paths.

The amount of information for block-by-block bit distribution, i.e., activity is calculated on the basis of the DCT transform coefficients. Such an amount cannot be directly produced from picture data not having undergone DCT calculation without resorting to an exclusive circuit. The embodiment uses the DCT circuit for such a purpose and, therefore, simplifies the construction of the device.

The embodiment having the above construction promotes accurate control over the amount of codes. The compression is completed in two different paths. Moreover, the calculation regarding bit distributions is simpler than in a conventional system and sets up accurate correspondence between the actual amounts of information associated with picture data and the allocated bit distribution values. This eliminates an occurrence that picture data which should be coded and outputted at a time are interrupted midway to degrade picture quality.

In summary, in accordance with the present invention, compression of picture data is preceded by preliminary compression for determining an adequate bit distribution. Therefore, whatever the input picture data may be, it is possible to compress picture data by a simple circuit arrangement while controlling the amount of codes with unprecedented accuracy. It follows that the invention insures a predetermined number of still picture frames in a memory card or similar picture data storing medium.

While the present invention has been described with reference to the particular illustrative embodiment, it is not to be restricted by those embodiments but only by the appended claims. It is to be appreciated that those skilled in the art can change or modify the embodiments without departing from the scope and spirit of the present invention.

What is claimed is:

1. A device for coding first picture data by compression to produce corresponding second picture data, comprising:

orthogonal transforming means for dividing one frame of the first picture data into a plurality of blocks each having a predetermined size, and executing orthogonal transform with each of said plurality of blocks;

first calculating means for calculating, prior to dividing the one frame of the first picture data into the plurality of blocks by said orthogonal transforming means, a rough amount of information involved in the one frame of the first picture data;

compression coding means for sequentially quantizing and coding DC components, lowest frequency components and higher frequency components in each of the plurality of blocks included in an output of said orthogonal transforming means in ascending order of frequency according to a quantizing step to thereby produce the second picture data in each of the plurality of blocks, said quantizing step being variably set in said compression coding means;

counting means for counting codes associated with the second picture data in each of the plurality of blocks;

setting means for selecting said quantizing step on the basis of either of the rough amount of information and an output count of said counting means as well as a target amount of codes associated with one frame of the second picture data, and setting said quantizing step in said compression coding means;

second calculating means for calculating a block activity of each of the plurality of blocks involved in said output of said orthogonal transforming means, and calculating a code distribution value for each of the plurality of blocks on the basis of the block activity calculated and the target amount of codes; and comparing means for comparing an output count of said counting means with the calculated code distribution value for each of the plurality of blocks and, when said output count in connection with one of the plurality of blocks reaches said code distribution value, disabling said orthogonal transforming means and said compression coding means in respect of said one block.

2. A method of coding first picture data by compression to produce corresponding second picture data, comprising the steps of:

(a) calculating a rough amount of information associated with one frame of the first picture data;

(b) dividing the one frame of the first picture data into a plurality of blocks each having a predetermined size, and executing orthogonal transform with each of said plurality of blocks;

(c) quantizing and coding DC components, lowest frequency components and higher frequency components of the picture data having undergone the orthogonal transform in each of the plurality of blocks in ascending order of frequency according to a quantizing step matching the rough amount of information and a target amount of codes associated with one frame of the second picture data to thereby produce the second picture data;

(d) counting codes associated with the second picture data;

(e) updating the quantizing step in matching relation to the amount of codes counted and the target amount of codes;

(f) again quantizing and coding DC components, lowest frequency components and higher frequency components of the picture data having undergone the orthogonal transform in each of the plurality of blocks in ascending order of frequency according to the updated quantizing step to thereby produce the second picture data;

(g) calculating a block activity of each of the plurality of blocks, wherein the block activity for each of the plurality of blocks and a total block activity for the one frame of the first picture data are determined independent of said steps (c) and (f);

(h) calculating a code distribution value for each of the plurality of blocks on the basis of the block activity calculated and the target amount of codes;

(i) counting codes associated with the output second picture data in each of the plurality of blocks; and (j) comparing the amount of codes calculated with the code distribution value for each of the plurality of blocks and, when said amount of codes in connection with one of the plurality of blocks reaches said code distribution value of said one block, stopping conversion to the second picture data in respect of said one block, and encoding each of the plurality of blocks, based on the allowed number of bits for each of the plurality of blocks, to produce the corresponding second picture data.

3. A device for coding first picture data by compression to produce corresponding second picture data, comprising:

orthogonal transforming means for dividing one frame of the first picture data into a plurality of blocks each having a predetermined size, and executing orthogonal transform with each of said plurality of blocks;

first calculating means for calculating, prior to dividing the one frame of the first picture data into the plurality of blocks by said orthogonal transforming means, a rough amount of information involved in the one frame of the first picture data;

compression coding means for sequentially quantizing and coding DC components, lowest frequency components and higher frequency components in each of the plurality of blocks included in an output of said orthogonal transforming means in ascending order of frequency according to a quantizing step to thereby produce the second picture data in each of the plurality of blocks, said quantizing step being variably set in said compression coding means;

first counting means for counting codes associated with the second picture data in each of the plurality of blocks;

setting means for selecting said quantizing step on the basis of either of the rough amount of information and an output count of said first counting means as well a target amount of codes associated with one frame of the second picture data, and setting said quantizing step in said compression coding means;

second calculating means for calculating a block activity of each of the plurality of blocks involved in said output of said orthogonal transforming means, and calculating a code distribution value for each of the plurality of blocks on the basis of the block activity calculated and the target amount of codes;

first comparing means for comparing said output count of said first counting means with the calculated code distribution value for each of the plurality of blocks and, when said output count in connection with one of the plurality of blocks reaches said code distribution value of said one block, disabling said orthogonal transforming means and said compression coding means in respect of said one block; and control means for controlling said first and second calculating means, said orthogonal transforming means, said compression coding means, said first counting means, said setting means and said first comparing means;

in a first period, said control means causing said first calculating means to calculate a rough amount of information associated with one frame of the first picture data, and causing said setting means to set in said compression coding means said quantizing step matching said rough amount of information and the target amount of codes;

in a second period following the first period, said control means feeding the one frame of the first picture data to said orthogonal transforming means, causing said orthogonal transforming means and said compression coding means to convert the first picture data to the second picture data, causing said first counting means to count codes of said second picture data, and causing said setting means to update the quantizing step of said compression coding means on the basis of said output count of said first counting means and the target amount of codes;

in a third period following the second period, said control means again feeding the one frame of the first picture data to said orthogonal transforming means, causing said orthogonal transforming means and said compression coding means to convert the first picture data to the second picture data, causing said second calculating means to calculate means calculating a code distribution value for each of the plurality of blocks, and causing said first comparing means to disable, when said output count of said first counting means connection with one of the plurality of blocks reaches said code distribution value of said one block, said orthogonal transforming means and said compression coding means in respect of said one block.

4. A device in accordance with claim 3, wherein said second calculating means comprises:

absolute value producing means for producing an absolute value of said output of said orthogonal transforming means;

second counting means for determining how many of the absolute values are greater than a threshold associated with the one frame of the first picture data; and code distributing means for calculating said code distribution value for each of the plurality of blocks on the basis of the determined number of the block activity calculated and the target amount of codes.

5. A device in accordance with claim 3, wherein said second calculating means comprises:

classifying means for classifying, among the outputs of said orthogonal transforming means, the outputs exceeding a predetermined threshold into a plurality of categories, and generating an indication indicative of a particular one of said plurality of categories to which the classified output belongs;

second counting means for summing up values of the generated indications; and code distributing means for calculating said code distribution value for each of the plurality of blocks on the basis of the block activity calculated and the target amount of codes.

6. A device in accordance with claim 3, further comprising threshold setting means for setting a threshold matching the rough amount of information in said second calculating means.

7. A device in accordance with claim 3, further comprising:

gate means for intercepting the outputs of said compression coding means in the second period and passing said outputs to an external output of the device in the third period;

said compression coding means adding a predetermined code to the end of the block of the second picture data in the third period in response to the output of said first comparing means.

8. A device in accordance with claim 3, wherein said first calculating means comprises picture activity calculating means for calculating a picture activity of one frame of the first picture data as the rough amount of information;

said setting means selecting said quantizing step on the basis of either of the picture activity and the output count of said first counting means and a target amount of codes associated with one frame of the second picture data.

9. A device in accordance with claim 3, wherein said second calculating means comprises:

absolute value means for producing an absolute value of said output of said orthogonal transforming means;

second comparing means for comparing the absolute value with a threshold;

second counting means for counting, among outputs of said second comparing means, the outputs which are greater than the threshold; and code distributing means for calculating the code distribution value for each of the plurality of blocks on the basis of the block activity calculated and the target amount of codes;

in the second period, said code distributing means calculating and holding a total block activity of one frame of the second picture data from said output count of said second counting means; in the third period, said code distributing means calculating a block activity of each block of the second picture data from said output count of said second counting means to thereby calculate the code distribution value on the basis of a ratio of said block activity to the total block activity and the target amount of codes.

10. A device in accordance with claim 3, wherein said second calculating means comprises:

classifying means for classifying, among the outputs of said orthogonal transforming means, the outputs greater than a predetermined threshold into a plurality of categories, and generating an indication indicative of a particular one of said categories to which the classified output belongs;

second counting means for summing up values of the indications generated by said classifying means; and code distributing means for calculating said code distribution value for each of the plurality of blocks on the basis of the block activity calculated and the target amount of codes;

in the second period, said code distributing means calculating and holding a total block activity of one frame of the second picture data from said output of said second counting means;

in the second period, said code distributing means calculating a block activity of each block of the second picture data from said output of said second counting means, and calculating the code distribution value on the basis of a ratio of said block activity to the total block activity and the target amount of codes.

11. An electronic still camera comprising:

imaging means for shooting a scene to generate one frame of a picture signal representative of a picture of said scene;

focusing means for focusing said picture onto said imaging means in response to a first signal;

orthogonal transforming means for dividing the one frame of the picture signal into a plurality of blocks each having a predetermined size, and executing orthogonal transform with each of said plurality of blocks;

first calculating means for extracting an edge component of a pattern represented by the one frame of the picture signal, prior to dividing the one frame of the first picture signal into the plurality of blocks by said orthogonal transforming means, to thereby output said edge component as the first signal;

compression coding means for sequentially quantizing and coding DC components, lowest frequency components and higher frequency components in each of the plurality of blocks included in an output of said orthogonal transforming means in ascending order of frequency according to a quantizing step to thereby produce picture data in each of the plurality of blocks, said quantizing step being variably set in said compression coding means;

counting means for counting codes associated with the picture data in each of the plurality of blocks;

setting means for selecting said quantizing step on the basis of either of the first signal and an output count of said counting means as well as a target amount of codes associated with one frame of the picture data, and setting said quantizing step in said compression coding means;

second calculating means for calculating a block activity of each of the plurality of blocks involved in said output of said orthogonal transforming means, and calculating a code distribution value for each of the plurality of blocks on the basis of the block activity calculated and the target amount of codes;

comparing means for comparing said output count of said counting means with the calculated code distribution value and, when said output count in connection with one of the plurality of blocks reaches said code distribution value of said one block, disabling said orthogonal transforming means and said compression coding means in respect of said one block; and control means for controlling said first and second calculating means, said orthogonal transforming means, said compression coding means, said counting means, said setting means, and said comparing means;

in a first period, said control means causing said first calculating means to extract an edge component of one frame of the picture signal, and causing said setting means to set in said compression coding means said quantizing step matching said edge component and the target amount of codes;

in a second period following the first period, said control means feeding the one frame of the picture signal to said orthogonal transforming means, causing said orthogonal transforming means and said compression coding means to convert the picture signal to the picture data, causing said counting means to count codes of said picture data, and causing said setting means to update the quantizing step of said compression coding means on the basis of said output count of said counting means and the target amount of codes;

in a third period following the second period, said control means again feeding the one frame of the picture signal to said orthogonal transforming means, causing said orthogonal transforming means and said compression coding means to convert the picture signal to the picture data, causing said second calculating means to calculate a code distribution value for each of the plurality of blocks, and causing said comparing means to disable, when said output count of said counting means in connection with one of the plurality of blocks reaches said code distribution value of said one block, said orthogonal transforming means and said compression coding means in respect of said one block.

12. A device for coding first picture data by compression to produce corresponding second picture data, comprising:

orthogonal transforming means for dividing one frame of the first picture data into a plurality of blocks each having a predetermined size, and executing an orthogonal transform on each of said plurality of blocks;

target calculating means for calculating, prior to dividing the one frame of the first picture data into the plurality of blocks by said orthogonal transforming means, a target number of bits using a roughly estimated quantization scaling factor for the one frame of the first picture data;

actual calculating means for correcting the roughly estimated quantization scaling factor based on the target number of bits and for calculating an allowed number of bits for each of the plurality of blocks by determining a block activity for each of the plurality of blocks, determining a total block activity for the one frame of the first picture data, and assigning the allowed number of bits for each of the plurality of blocks based on a ratio of the block activity of each of the plurality blocks to the total block activity of the one frame of the first picture data and the target number of bits, wherein the block activity for each of the plurality of blocks and the total block activity for the one frame of the first picture data are determined independent of the roughly estimated quantization scaling factor; and encoding means for encoding each of the plurality of blocks based on the allowed number of bits for each of the plurality of blocks to produce the corresponding send picture data.

13. A method of coding first picture data by compression to produce corresponding second picture data, comprising the steps of:

(a) dividing one frame of the first picture data into a plurality of blocks each having a predetermined size, and executing an orthogonal transform on each of said plurality of blocks;

(b) calculating, prior to dividing the one frame of the first picture data into the plurality of blocks, a target number of bits using a roughly estimated quantization scaling factor for the one frame of the first picture data; and (c) correcting the roughly estimated quantization scaling factor based on the target number of bits, calculating an allowed number of bits for each of the plurality of blocks by determining a block activity for each of the plurality of blocks, determining a total block activity for the one frame of the first picture data, wherein the block activity for each of the plurality of blocks and the total block activity for the one frame of the first picture data are determined independent of the roughly estimated quantization scaling factor; and assigning the allowed number of bits for each of the plurality of blocks based on a ratio of the block activity of each of the plurality blocks to the total block activity of the one frame of the first picture data and the target number of bits, and encoding each of the plurality of blocks, based on the allowed number of bits for each of the plurality of blocks, to produce the corresponding second picture data.

14. The device of claim 12, said target calculating means including a pre-processing circuit for receiving a color component signal from a picture data source and converting the color component signal to a luminance signal and a chrominance signal which make up the one frame of the first picture data; and picture activity detecting means for detecting a picture activity of each of the plurality of blocks of the one frame of the first picture data.

15. The device of claim 12, further comprising a frame memory for storing the one frame of the first picture data.

16. The device of claim 14, wherein the orthogonal transform executed by said orthogonal transforming means is a discrete cosine transform (DCT), said orthogonal transforming means further including, quantizing means for normalizing transform coefficients produced by the discrete cosine transform (DCT) for each of the plurality of blocks, and encoding means for encoding and adaptively transforming the normalized transform coefficients to produce the corresponding second picture data.

17. The device of claim 14, wherein the picture activity of each of the plurality of blocks is defined by:

$$ACT=|X_i-X_{i-2}| \text{ for } i=2 \text{ to } N$$

where

ACT=the picture activity of each of the plurality of blocks, $X_i-X_{i-2}$=pixels in a scanning direction, and N=the total number of pixels in the scanning direction.

18. The device of claim 17, wherein the scanning direction is one of a horizontal scanning direction and a vertical scanning direction.

19. The device of claim 17, said picture activity detecting means including delay means for sequentially receiving and delaying the total number of pixels in the scanning direction, a subtractor for subtracting the $X_{i-2}$ pixel from the $X_i$ pixel, for i=2 to N, absolute value detecting means for detecting an absolute value of $X_i-X_{i-2}$ for i=2 to N, and summing means for summing the absolute value of $X_i-X_{i-2}$ for i=2 to N.

20. The device of claim 14, wherein the picture activity is defined by:

$$ACT=|X_i-(X_{i-1}+X_{i+1})/2| \text{ for } i=2 \text{ to } N-1$$

where

ACT=the picture activity, $X_i$, $X_{i-1}$, $X_{i+1}$=pixels in a scanning direction, and N=the total number of pixels in the scanning direction.

21. The device of claim 20, wherein the scanning direction is one of a horizontal scanning direction and a vertical scanning direction.

22. The device of claim 20, said picture activity detecting means including delay means for sequentially receiving and delaying the total number of pixels in the scanning direction, an adder for adding the $X_{i-1}$ and $X_{i+1}$ pixels for i=2 to N-1, mean value detecting means for detecting a mean value of $X_{i-1}$ and $X_{i+1}$ for i=2 to N-1, and absolute value detecting means for detecting an absolute value of $X_i-(X_{i-1}+X_{i+1})/2$ for i=2 to N-1.

23. The device of claim 16, wherein the picture activity of each of the plurality of blocks of the one frame of the first picture data is utilized to set a quantizing step of said quantizing means.

24. A device for coding first picture data by compression to produce corresponding second picture data, comprising:

orthogonal transforming means for dividing one frame of the first picture data into a plurality of blocks each having a predetermined size, and executing an orthogonal transform on each of said plurality of blocks;

target calculating means for calculating, prior to dividing the one frame of the first picture data into the plurality of blocks by said orthogonal transforming means, a target number of bits using a roughly estimated quantization scaling factor for the one frame of the first picture data;

actual calculating means for correcting the roughly estimated quantization scaling factor based on the target number of bits and for calculating an allowed number of bits for each of the plurality of blocks by determining a block activity for each of the plurality of blocks, determining a total block activity for the one frame of the first picture data, and assigning the allowed number of bits for each of the plurality of blocks based on a ratio of the block activity of each of the plurality blocks to the total block activity of the one frame of the first picture data and the target number of bits, wherein the block activity for each of the plurality of blocks and the total block activity for the one frame of the first picture data are determined independent of the roughly estimated quantization scaling factor; and encoding means for encoding each of the plurality of blocks based on the allowed number of bits for each of the plurality of blocks to produce the corresponding send picture data, said target calculating means including a preprocessing circuit for receiving a color component signal from a picture data source and converting the color component signal to a luminance signal and a chrominance signal which make up the one frame of the first picture data; and picture activity detecting means for detecting a picture activity of each of the plurality of blocks of the one frame of the first picture data, said actual calculating means determining the total block activity for the one frame of the first picture data by comparing the picture activity of each of the plurality of blocks with a threshold and setting the total block activity to a number of times the picture activity of each of the plurality of blocks exceeds the threshold.

25. The device of claim 14, wherein said actual calculating means receives the target number of bits from a picture data storing medium.

26. The device of claim 16, further comprising a code counter, for determining a total amount of codes accumulated block-by-block for the one frame of the first picture data and when the total amount of codes equals the allowed number of bits for each of the plurality of blocks, said code counter outputs a code stop signal to said encoding means.

27. The device of claim 26, wherein the total amount of codes accumulate block-by-block for the one frame of the first picture data and the allowed number of bits for each of the plurality of blocks are utilized by said target calculating means to update the roughly estimated quantization scaling factor.

28. The method of claim 13, said step (b) including the sub-steps of, (b)(1) receiving a color component signal from a picture data source and converting the color component signal to a luminance signal and a chrominance signal which make up the one frame of the first picture data, and (b)(2) detecting a picture activity of each of the plurality of blocks of the one frame of the first picture data.

29. The method of claim 13, wherein the one frame of the first picture data is stored in a frame memory.

30. The method of claim 28, wherein the orthogonal transform executed in said step (a) is a discrete cosine transform (DCT), said step (a) further including the sub-steps of, (a)(1) normalizing transform coefficients produced by the discrete cosine transform (DCT) for each of the plurality of blocks, and (a)(2) encoding and adaptively transforming the normalized transform coefficients to produce the corresponding second picture data.

31. The method of claim 28, wherein the picture activity of each of the plurality of blocks is defined by:

$$ACT=|X_i-X_{i-2}| \text{ for } i=2 \text{ to } N$$

where

ACT=the picture activity of each of the plurality of blocks, $X_i-X_{i-2}$=pixels in a scanning direction, and N=the total number of pixels in the scanning direction.

32. The method of claim 31, wherein the scanning direction is one of a horizontal scanning direction and a vertical scanning direction.

33. The method of claim 31, said step (b)(2) including the sub-steps of, (b)(2)(a) sequentially receiving and delaying the total number of pixels in the scanning direction, (b)(2)(b) subtracting the $X_{i-2}$ pixel from the $X_i$ pixel, for i=2 to N, (b)(2)(c) detecting an absolute value of $X_i-X_{i-2}$ for i=2 to N, and (b)(2)(d) summing the absolute value of $X_i-X_{i-2}$ for i=2 to N.

34. The method of claim 28, wherein the picture activity is defined by:

$$ACT=|X_i-(X_{i-1}+X_{i+1})/2| \text{ for } i=2 \text{ to } N-1$$

where

ACT=the picture activity, $X_i$, $X_{i-1}$, $X_{i+1}$=pixels in a scanning direction, and N=the total number of pixels in the scanning direction.

35. The method of claim 34, wherein the scanning direction is one of a horizontal scanning direction and a vertical scanning direction.

36. The method of claim 34, said step (b)(2) including the sub-steps of,
- (b)(2)(a) sequentially receiving and delaying the total number of pixels in the scanning direction,
- (b)(2)(b) adding the $X_{i-1}$ and $X_{i+1}$ pixels for i=2 to N-1,
- (b)(2)(c) detecting a mean value of $X_{i-1}$ and $X_{i+1}$ for i=2 to N-1, and
- (b)(2)(d) detecting an absolute value of $X_i-(X_{i-1}+X_{i+1})/2$ for i=2 to N-1.

37. The method of claim 30, wherein the picture activity of each of the plurality of blocks of the one frame of the first picture data is utilized to set a quantizing step in said step (a)(1).

38. A method of coding first picture data by compression to produce corresponding second picture data, comprising the steps of:
- (a) dividing one frame of the first picture data into a plurality of blocks each having a predetermined size, and executing an orthogonal transform on each of said plurality of blocks;
- (b) calculating, prior to dividing the one frame of the first picture data into the plurality of blocks, a target number of bits using a roughly estimated quantization scaling factor for the one frame of the first picture data; and
- (c) correcting the roughly estimated quantization scaling factor based on the target number of bits, calculating an allowed number of bits for each of the plurality of blocks by determining a block activity for each of the plurality of blocks, determining a total block activity for the one frame of the first picture data, wherein the block activity for each of the plurality of blocks and the total block activity for the one frame of the first picture data are determined independent of the roughly estimated quantization scaling factor; and
- (d) assigning the allowed number of bits for each of the plurality of blocks based on a ratio of the block activity of each of the plurality blocks to the total block activity of the one frame of the first picture data and the target number of bits, and encoding each of the plurality of blocks, based on the allowed number of bits for each of the plurality of blocks, to produce the corresponding second picture data, said step (b) including the sub-steps of,
- (b)(1) receiving a color component signal from a picture data source and converting the color component signal to a luminance signal and a chrominance signal which make up the one frame of the first picture data, and
- (b)(2) detecting a picture activity of each of the plurality of blocks of the one frame of the first picture data.

39. The method of claim 28, wherein the target number of bits in said step (c) are received from a picture data storing medium.

40. The method of claim 30, further comprising the sub-steps of
- (a)(3) determining a total amount of codes accumulated block-by-block for the one frame of the first picture data and when the total amount of codes equals the allowed number of bits for each of the plurality of blocks, outputting a code stop signal to stop encoding in said step (a)(2).

41. The method of claim 40, wherein the total amount of codes accumulate block-by-block for the one frame of the first picture data and the allowed number of bits for each of the plurality of blocks are utilized in said step (b) to update the roughly estimated quantization scaling factor.

42. The device of claim 12, wherein said device is a component of a digital electronic still camera.

43. The method of claim 13, wherein said method is performed in a digital electronic still camera.

44. A device for coding first picture data by compression to produce corresponding second picture data, comprising:

preprocessing means for preprocessing the first picture data to produce a picture activity signal;

first processing means for processing the first picture data according to a first path by setting a quantizing step based on the picture activity signal, dividing the first picture data into a plurality of blocks and executing an orthogonal transform on each of the plurality of blocks to produce first transform coefficients, normalizing the first transform coefficients based on the quantizing step, encoding the normalized first transform coefficients to produce coded data, determining an amount of the coded data and comparing the amount of the coded data with a target amount of codes and updating the quantizing step based on said comparison and the picture activity signal, and comparing a block activity signal for each of the plurality of blocks with a threshold and storing a total block activity signal which represents a number of the plurality of blocks whose block activity signal exceeds a predetermined threshold; and second processing means for processing the first picture data according to a second path by reexecuting the orthogonal transform on each of the plurality of blocks to produce second transform coefficients, normalizing the second transform coefficients based on the updated quantizing step, encoding the normalized second transform coefficients to produce coded data and outputting the coded data as the corresponding second picture data for storage on a picture storing medium, and determining an amount of the coded data for each of the plurality of blocks and comparing the amount of the coded data for each of the plurality of blocks with a bit distribution value, determining for each of the plurality of blocks, and terminating the encoding and outputting when the amount of the coded data for each of the plurality of blocks equals the bit distribution value, determined for each of the plurality of blocks.

45. A method of coding first picture data by compression to produce corresponding second picture data, comprising the steps of:
- (a) preprocessing the first picture data to produce a picture activity signal;
- (b) processing the first picture data according to a first path, including the sub-steps of,
  - (b)(1) setting a quantizing step based on the picture activity signal;
  - (b)(2) dividing the first picture data into a plurality of blocks and executing an orthogonal transform on each of the plurality of blocks to produce first transform coefficients,
  - (b)(3) normalizing the first transform coefficients based on the quantizing step;
  - (b)(4) encoding the normalized first transform coefficients to produce coded data,
  - (b)(5) determining an amount of the coded data and comparing the amount of the coded data with a target amount of codes and updating the quantizing step based on said comparison and the picture activity signal, and (b)(6) comparing a block activity signal for each of the plurality of blocks with a threshold and storing a total block activity signal which represents a number of the plurality of blocks whose block activity signal exceeds a predetermined threshold; and (c) processing the first picture data according to a second path, including the sub-steps of, (c)(1) reexecuting the orthogonal transform on each of the plurality of blocks to produce second transform coefficients, (c)(2) normalizing the second transform coefficients based on the updated quantizing step, (c)(3) encoding the normalized second transform coefficients to produce coded data and outputting the coded data as the corresponding second picture data for storage on a picture storing medium; and (c)(4) determining an amount of the coded data for each of the plurality of blocks and comparing the amount of the coded data for each of the plurality of blocks with a bit distribution value, determining for each of the plurality of blocks, and terminating said encoding and outputting in said step (c)(3) when the amount of the coded data for each of the plurality of blocks equals the bit distribution value, determined for each of the plurality of blocks.

46. The device of claim 44, wherein said device is a component of a digital electronic still camera.

47. The method of claim 45, wherein said method is performed in a digital electronic still camera.

* * * * *